United States Patent [19]
Cavil et al.

[11] 4,214,288
[45] Jul. 22, 1980

[54] DIRECT CURRENT MOTOR CONTROL WITH PROTECTIVE SOLENOID LATCHING

[75] Inventors: David T. Cavil, Menomonee Falls, Wis.; Gerald N. McAuliffe, Lincoln, Nebr.

[73] Assignee: Outboard Marine Corporation, Waukegan, Ill.

[21] Appl. No.: 967,611

[22] Filed: Dec. 8, 1978

[51] Int. Cl.² .............................................. H02P 3/00
[52] U.S. Cl. ........................................ 361/6; 361/8; 361/194; 361/92; 318/139
[58] Field of Search ................... 361/2, 6, 7, 187, 194, 361/92, 8; 318/453, 454, 478, 479, 554, 139; 307/10 BP, 130

[56] References Cited
U.S. PATENT DOCUMENTS

| | | | |
|---|---|---|---|
| 3,118,091 | 1/1964 | De Sautels | 361/194 |
| 3,522,481 | 8/1970 | Terzic | 361/92 |
| 3,639,808 | 2/1972 | Ritzow | 361/6 X |
| 3,818,293 | 6/1974 | Wood et al. | 318/139 |
| 3,868,549 | 2/1975 | Schaefer et al. | 361/6 X |
| 4,008,423 | 2/1977 | Christianson et al. | 318/139 |
| 4,099,105 | 7/1978 | McAuliffe | 318/459 X |

*Primary Examiner*—J. D. Miller
*Assistant Examiner*—L. C. Schroeder
*Attorney, Agent, or Firm*—Michael, Best & Friedrich

[57] ABSTRACT

Disclosed herein is a direct current motor control circuit adapted for connection to first and second supply terminals of DC power source and to a DC motor connected between the positive and negative terminals of a DC power source, the control circuit including a solenoid including a solenoid coil having one end connected to the first supply terminal and having an opposite end, and having a pair of solenoid contacts connected in series relation with the DC motor between the positive and negative terminals and which close to energize the DC motor when current flows through the solenoid coil. The circuit also includes semiconductor switching means having a first terminal connected to the opposite end of the solenoid coil, a second terminal connected to the second supply terminal, and a third terminal, the switching means being selectively rendered conductive for allowing current flow through the solenoid coil, and protective solenoid latching circuit means including an optical coupler for electrically isolating the solenoid contacts from the solenoid coil, the coupler having a light sensitive transistor connected to the third terminal of the semiconductor switching means and having an LED, the protective circuit means also including an upper voltage threshold means connected in series relation with the LED across the solenoid contacts so that when the voltage across the solenoid contacts exceeds a predetermined upper value, current flows through the voltage threshold means and the LED to render conductive the light sensitive transistor which shunts the third terminal of the semiconductor switching means to prevent conduction of the semiconductor switching means and chatter of the solenoid contacts.

23 Claims, 6 Drawing Figures

DIRECT CURRENT MOTOR CONTROL WITH PROTECTIVE SOLENOID LATCHING

BACKGROUND OF THE INVENTION

The invention relates to vehicles such as golf carts or light industrial vehicles driven by direct-current electric motors, and to controls which energize such DC motors by closure of relay or solenoid contacts. More particularly, the invention relates to such DC motor controls including protective solenoid latching to prevent chatter of the solenoid contacts.

Chatter of solenoid contacts can occur, for example, during rapid vehicle accelleration or high battery load conditions when the voltage of the batteries energizing the solenoid coil drops to a level causing the solenoid to drop out or the solenoid contacts to open, thereby deenergizing the DC motor. As soon as the solenoid contacts open, however, the high battery load condition is eliminated and the voltage of the batteries increases resulting in the solenoid contacts reclosing. This opening and closing of the solenoid contacts or solenoid chatter is particularly undesirable when the voltage across the solenoid contacts exceeds an upper voltage level, since the solenoid chatter results in destruction or welding together of the solenoid contacts as a result of current arcing across the solenoid contacts.

Attention is directed to a solenoid latching switch disclosed in U.S. patent application Ser. No. 771,159, filed Feb. 23, 1977, now U.S. Pat. No. 4,099,105 and assigned to the same assignee as this application.

SUMMARY OF THE INVENTION

The invention provides a direct current motor control circuit adapted for connection to first and second supply terminals of a DC power source and to a DC motor connected between the positive and negative terminals of a DC power source, the control circuit including a solenoid including a solenoid coil connected between the first and second supply terminals, and having a pair of solenoid contacts connected in series relation with the DC motor between the positive and negative terminals and which close to energize the DC motor when current flows through said solenoid coil. The circuit also includes semiconductor switching means having first and second terminals connected in series relation with the solenoid coil between the first and second supply terminals for controlling the current flow through the solenoid coil, and protective solenoid latching circuit means connected to the semiconductor switching means for controlling conduction of the switching means to selectively prevent current flow through the solenoid coil and closing of the solenoid contacts.

In accordance with an embodiment of the invention, the protective circuit means includes buffer control means for electrically isolating the solenoid contacts from the solenoid coil and for controlling conduction of the semiconductor switching means in response to the magnitude of voltage across the solenoid contacts to prevent chatter of the solenoid contacts.

Also in accordance with an embodiment of the invention, the protective circuit means also includes solenoid drop-out means connected to the semiconductor switching means for preventing conduction of the semiconductor switching means when the voltage supplied by the first and second supply terminals decreases below a predetermined lower value.

Also in accordance with an embodiment of the invention, the protective circuit means further includes upper voltage threshold means connected to the buffer control means for sensing the voltage across the solenoid contacts and for rendering the buffer control means operative to prevent conduction of the semiconductor switching means when the voltage across the solenoid contacts exceeds a predetermined upper value.

Also in accordance with an embodiment of the invention, the buffer control means comprises an optical coupler including a light sensitive transistor connected to the semiconductor switching means and a LED connected in series relation with the upper voltage threshold means across the solenoid contacts so that when the voltage across the solenoid contacts exceeds the predetermined upper value, current flows through the voltage threshold means and the LED to render conductive the light sensitive transistor which prevents conduction of the semiconductor switching means.

Also in accordance with an embodiment of the invention, the upper voltage threshold means comprises a zener diode having a breakdown voltage generally equal to the predetermined upper value, and wherein the protective circuit means further comprises current limiting means connected in series relation with the zener diode and the LED.

Also in accordance with an embodiment of the invention, the semiconductor switching means comprises a solenoid driver transistor including a third terminal comprising a base, and wherein the light sensitive transistor is connected to the base to shunt the base current of the driver transistor when the light sensitive transistor is rendered conductive.

Also in accordance with an embodiment of the invention, the first mentioned protective circuit means comprises solenoid drop-out means connected to the semiconductor switching means for preventing conduction of the semiconductor switching means when the voltage supplied by the first and second supply terminals decreases below a predetermined lower value.

In another embodiment including the solenoid drop-out means, the semiconductor switching means comprises first semiconductor switching means, and the solenoid drop-out means comprises second semiconductor switching means connected to the first semiconductor switching means for controlling conduction of the first semiconductor switching means, and also comprises lower voltage threshold means connected to the second semiconductor switching means for rendering the second semiconductor switching means operative to prevent conduction of the first semiconductor switching means when the voltage across the first and second supply terminals drops below the predetermined lower value.

In another embodiment including the solenoid drop-out means, the first semiconductor switching means comprises a first transistor including a third terminal comprising a base, and the second semiconductor switching means comprises a second transistor including a base, and an emitter and collector connected in series between one of the supply terminals and the first transistor base, and the lower voltage threshold means is connected between the second transistor base and the one of the supply terminals.

In another embodiment including the solenoid drop-out means, the first semiconductor switching means comprises a first transistor including a third terminal comprising a base and the second semiconductor switching means comprises a second transistor including a base, and an emitter and collector connected in series between one of the supply terminals and the first transistor base, and wherein the lower voltage threshold means is connected to the second transistor base and the other one of the supply terminals.

In another embodiment including the solenoid drop-out means, the first transistor comprises a Darlington transistor and the lower voltage threshold means comprises a zener diode which senses the voltage between the first and second supply terminals in series with the base emitter junction of the Darlington transistor so that the magnitude of the lower predetermined voltage across the supply terminals at which the first transistor is rendered nonconductive is appreciably temperature dependent.

Also in accordance with an embodiment of the invention, the first mentioned control circuit further comprises a solenoid actuating switch connected in series with the solenoid coil between the first and second supply terminals, and the protective circuit means comprises solenoid latching switch means associated with the solenoid actuating switch for being in an open position when the solenoid actuating switch is open, and for moving from the open position to a closed position after closing of the solenoid actuating switch, the protective circuit means also comprising buffer control means for electrically isolating the solenoid contacts from the solenoid coil, and being connected to the solenoid latching switch means for preventing conduction of the semiconductor switching means to prevent chatter of the solenoid contacts when the solenoid contacts open after the solenoid latching switch means has moved to the closed position.

One of the principal features of the invention is the provision of a direct current motor control circuit including a solenoid coil having current flow controlled by semiconductor switching means, and protective solenoid latching circuit means connected to the semiconductor switching means for controlling conduction of the semiconductor switching means to selectively prevent current flow through the solenoid coil and chatter of the solenoid contacts.

Another of the principal features of the invention is to provide such a control circuit suitable for use with a DC motor energized by a variable voltage DC source and wherein the protective solenoid latching circuit means includes buffer control means for electrically isolating the solenoid contacts from the solenoid coil and for controlling conduction of semiconductor switching means in response to the magnitude of voltage across the solenoid contacts.

Another of the principal features of the invention, is the provision of such a control circuit wherein the buffer control means comprises an optical coupler including a light sensitive transistor connected to the semiconductor switching means and a LED, and also comprises an upper voltage threshold means connected in series with the LED across the solenoid contacts so that when voltage across the solenoid contacts exceeds a predetermined upper value, current flows through the voltage threshold means and the LED to render conductive the light sensitive transistor which prevents conduction of the semiconductor switching means, and hence, solenoid chatter.

Another principal feature of the invention is the provision of a vehicle including a direct current motor control having a DC power source, first and second supply terminals, and a DC motor connected between positive and negative terminals of a variable voltage DC power source, and a direct current motor control circuit wherein the solenoid contacts are electrically isolated from the solenoid coil as previously described.

Another of the principal features of the invention is the provision of a control circuit as first mentioned wherein the protective circuit means includes solenoid drop-out means for preventing conduction of the semiconductor switching means when the voltage supplied to energize the control circuit decreases below a predetermined lower value.

Other features and advantages of the embodiments of the invention will become known by reference to the following general description, claims, and appended drawings.

THE DRAWINGS

Figure 1:
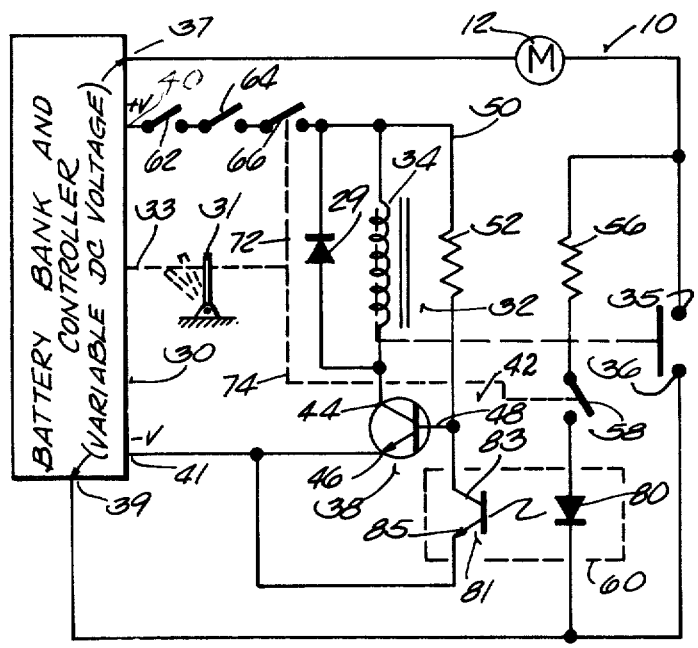
FIG. 1 is a schematic view of a direct-current motor control embodying various features of the invention.

Before explaining the embodiments of the invention in detail, it is to be understood that the invention is not limited in its application to the details of construction and the arrangement of the components set forth in the following description or illustrated in the drawings, and that the invention is capable of other embodiments and of being practiced and carried out in various ways. Also, it is to be understood that the phraseology and terminology employed herein is for the purpose of description and should not be regarded as limiting.

GENERAL DESCRIPTION

Referring more particularly to the drawings, wherein like numerals refer to like parts throughout the several views, FIG. 1 schematically shows a direct current motor control 10 which operates to connect a direct current electric motor 12 to a source of direct current, such as one or more batteries or a battery bank, illustrated disagrammatically in the form of a labelled box 30. In addition to representing a battery bank, the labelled box 30 also constitutes a representation of any suitable speed control mechanism and/or reversing control mechanism, the speed control mechanism or controller being suitably connected to an accelerator pedal 31 by a suitable linkage 33, shown schematically by dotted line. As indicated by the labelling on box 30, the controller is connected to the battery bank and is operative so that a variable DC voltage is supplied from the positive and negative terminals 37 and 39 to energize the motor 12. A controller arrangement suitable to provide such a variable DC voltage is disclosed in pending U.S. patent application Ser. No. 798,534, filed Apr. 25, 1977, now U.S. Pat. No. 4,096,275, which application is assigned to the same assignee as the present application.

Figure 6:
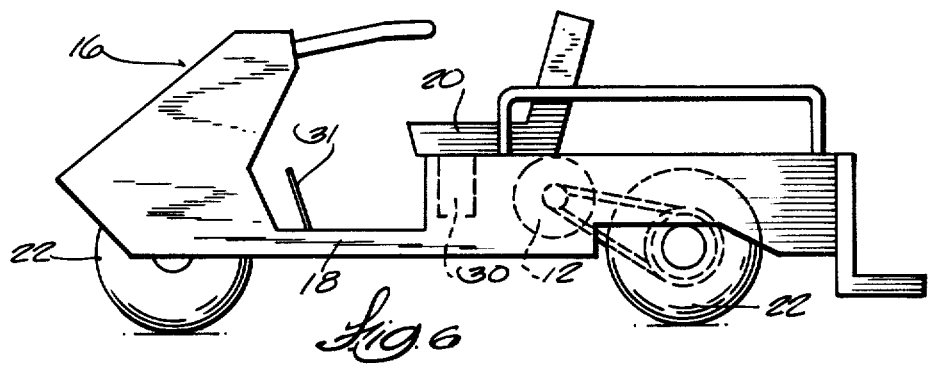
FIG. 6 is a schematic view of a vehicle including a DC motor control and embodying various features of the invention.

The DC motor 12, which is shown schematically in FIGS. 1-4, can include an armature winding and a series field winding (as specifically shown in FIG. 5), or can be a DC motor including a permanent magnet and a single winding. The motor 12 can be utilized to drive a vehicle 16 (see FIG. 6), the vehicle conventionally including a frame 18 and a seat 20 which is supported on a set of wheels 22 and which carries the battery bank or box 30 and the accellerator pedal 31.

As shown in FIG. 1, the control 10 includes a solenoid, generally designated 32, having a solenoid coil 34 and a pair of solenoid contacts 35 and 36 which are open in the absence of current flow through the solenoid coil 34. A free wheeling diode 29 is connected in parallel with the solenoid coil 34. The drive motor 12 is connected in series relation with the pair or normally open solenoid contacts 35 and 36 between positive and negative terminals 37 and 39 of the battery bank 30. As the acellerator pedal 31 is increasingly depressed, the voltage supplied to the motor 12 from terminals 37 and 39 increases.

The control 10 also includes an ignition switch 62, a seat switch 64, and a solenoid actuating switch 66, all of which are connected in series relation with the solenoid coil 34 and which must be closed in order for current to flow through the solenoid coil 34. The ignition switch 62 is adapted to be opened and closed by an ignition key (not shown). The seat switch 64 is a normally open switch which is closed in response to receipt on the vehicle seat of the operator's weight. The solenoid actuating switch 66 is connected to the accelerator pedal 31 by a suitable linkage 72, shown schematically by dotted line, and is movable from an open to a closed position to enable energizing the motor 12 in response to operation or depression of the accelerator pedal 31 which is manually regulated by the operator. If desired, the ignition switch and seat switch can be omitted and various of the features of the invention can still be obtained.

The control 10 also includes semiconductor switching means, preferably in the form of a solenoid driver transistor 38, which controls current flow through the solenoid coil 34, and has a collector 44 and an emitter 46 connected in series relation with the solenoid coil 34 between positive and negative voltage supply terminals 40 and 41. The solenoid driver transistor 38 also includes a base 48, selectively biased by and connected to the positive voltage supply terminal 40 by means of a line 50 including a current limiting resistor 52 and switches 62, 64 and 66. The supply terminals 40 and 41 are connected or tapped in to the battery bank 30 to provide a generally constant voltage, for example 18 volts, when the batteries are fully charged.

In order to latch the solenoid or prevent chatter or reclosing of the solenoid contacts when the magnitude of the voltage supplied to the motor exceeds, for example, a predetermined upper valve which could cause welding of or damage to the solenoid contacts, the control 10 also includes protective solenoid latching circuit means, generally designated 42, coupled to the switching means or transistor 38 for selectively preventing current flow through the transistor 38, and hence, through the solenoid coil 34. More particularly, as shown in the illustrated construction in FIG. 1, the protective circuit means 42 includes a solenoid latching switch 58, and isolator or buffer control means 60 connected across the solenoid contacts 35 and 36 and coupled to the transistor 38 to selectively prevent conduction of transistor 38, and to electrically isolate the solenoid coil 34 and the solenoid contacts 35 and 36. The solenoid latching switch 58 is connected to the accelerator pedal 31 by a suitable linkage 74, shown schematically by dotted line, so that as the pedal 31 is depressed, the latching switch 58 closes shortly after closure of the solenoid actuating switch 66, for example, when the voltage supplied to the motor 12 is above the predetermined value. The latching switch 58 is open when the solenoid actuating switch is open. A current limiting resistor 56 is preferably connected in series with the latching switch 58.

While the protective circuit means including the buffer control means can be utilized with a battery bank providing a generally constant voltage to energize the DC motor, the protective circuit means is particularly suitable for use with a battery bank and controller wherein the terminals connected to the DC motor supply a variable DC voltage. This particular suitability results from the use of protective circuit means including the buffer control means which electrically isolates the solenoid contacts from the solenoid coil, and from the use of upper voltage threshold means (described below) which senses the voltage across the solenoid contacts independently of the generally constant voltage which is needed to energize the solenoid coil. Thus, by electrically isolating the solenoid contacts from the solenoid coil, the variable voltage appearing across the solenoid contacts, if the solenoid contacts should open during motor operation, can be sensed or utilized to provide effective solenoid latching and to prevent solenoid chatter.

More particularly, while various buffer control means arrangements could be utilized, such means 60 preferably comprises an optical coupler including a light emitting diode (LED) 80 connected in series relation with the latching switch 58 across the solenoid contacts. The optical coupler also conventionally includes a light sensistive transistor 81 which is rendered conductive when the LED 80 emits light or is turned on, resulting from current flow through the LED. The coupler transistor 81 includes a collector 83 connected to the base 48 of the solenoid driver transistor 38 and an emitter 85 connected to the emitter 46 of transistor 38 to shunt the base drive of transistor 38 when transistor 81 is rendered conductive by LED 80 turning on. A description of the operation of the direct current motor control 10, including the operation of the protective solenoid latching circuit means 42, is given below.

Assuming the ignition and seat switches 62 and 64 are closed, and the accelerator pedal 31 is depressed to close the solenoid actuating switch 66, the solenoid driver transistor 38 is supplied with base current from positive supply terminal 40. Thus, transistor 38 is rendered conductive so that current flows through the solenoid coil 34 which is energized so that the solenoid contacts 35 and 36 close to energize motor 12 or to connect the motor 12 to and between the terminals 37 and 39. At this point, until the accelerator pedal is depressed further, the solenoid latching switch 58 remains open. With the latching switch 58 open, no current can flow through the LED 80, and hence, the LED 80 of the optical coupler 60 can not light or turn on, even when there is voltage across the solenoid contacts 35 and 36. Thus, the transistor 81 of the coupler 60 remains off, and does not effect the conducting state of the driver transistor 38.

As the accelerator pedal 31 is further advanced, for example, so that the voltage supplied to the motor 12 increases to above a predetermined value, the solenoid latching switch 58 closes. The point at which the latching switch 58 closes, which point generally corresponds to the predetermined upper voltage value, can be set by adjustment of the linkage 74, shown schematically, connecting the latching switch to the accelerator pedal 31. As noted above, however, before the latching switch 58 closes, the solenoid actuating switch 66 and the solenoid contacts 35 and 36 have already closed, thereby shunting the current limiting resistor 56 and LED 80 so that the LED of the optical coupler does not light. If the solenoid contacts should open, however, when the accelerator is significantly depressed, i.e., when the latching switch 58 is closed, the voltage impressed across the open solenoid contacts will cause current to flow through resistor 56 and light the LED 80 so that the light sensitive transistor 81 will turn on or be rendered conductive.

When turned on, transistor 81 shunts the base drive or cuts off the current flow to base 48 of transistor 38, thereby turning the solenoid driver transistor 38 off to prevent reclosing or chatter of the solenoid contacts. The transistor 38 remains nonconductive until the accelerator pedal 31 is returned by an operator to a position where the solenoid latching switch 58 opens, at which point the LED of the optical coupler 60 turns off so that transistor 81 no long shunts the base drive of transistor 38, and current is again able to flow through the solenoid coil 34. Since release of the accelerator pedal to a point where latching switch 58 opens also reduces the magnitude of voltage supplied to the motor 12, damage to the solenoid contacts, such as welding, resulting from solenoid chatter or reclosing at high voltage is prevented. Thus, if the solenoid contacts open during operation because of, for example, high load on the batteries, the protective circuit means 40 forces an operator to return the accelerator pedal to an initial position, and to depress the accelerator pedal more gradually in order to reduce the load on the batteries to keep the motor energized, thus warning the operator of depleted batteries and resulting in extended battery life.

Figure 2:
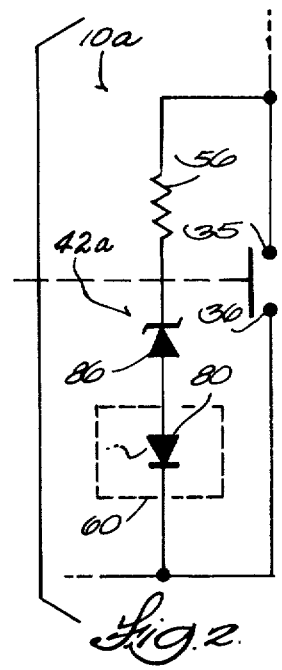
FIG. 2 is a partial schematic view showing the control of FIG. 1 with a modified portion to illustrate an alternative DC motor control embodying various features of the invention.

Shown in FIG. 2 is a partial schematic view of an alternative motor control 10a. Parts shown in the control of FIG. 2, and in the other motor controls shown in FIGS. 3, 4, and 5, which are similar but not the same as corresponding parts already described with respect to the control of FIG. 1, will be denoted by the same numeral but will include a letter subscript. For example, similar parts in FIG. 2 will have the subscript "a", similar parts in FIG. 3 the subscript "b", and so on. As noted earlier, parts which are the same in corresponding figures will be denoted by the same numerals without subscripts.

Returning to FIG. 2, the motor control 10a differs from the control 10 shown in FIG. 1 by having protective circuit means 42a which includes an upper voltage threshold means, preferably in the form of a zener diode 84, instead of the solenoid latching switch 58. The voltage threshold means is rendered conductive when the voltage impressed across the voltage threshold means exceeds a threshold voltage. The zener diode 84, or more particularly, its threshold or breakdown voltage, determines the predetermined upper voltage value above which the protective circuit means 42a will prevent solenoid chatter.

During operation, the accelerator pedal 31 (see FIG. 1) is linked to the battery bank 30 so that the variable voltage supplied from the terminals 37 and 39 and which appears across the open solenoid contacts will not breakdown zener diode 86 until after the solenoid actuating switch 66 is closed, at which point the solenoid contacts shunt the zener diode 86 so that it will not breakdown. Thus, assuming zener diode 86 has a breakdown voltage of 8 volts, for example, the protective circuit means 42a ignores voltages across the solenoid contacts of 8 volts or less. If, during operation, the solenoid contacts open with the accelerator depressed significantly, (i.e., with the voltage across the solenoid contacts 35 and 36 exceeding 8 volts) zener diode 86 will breakdown, the LED 80 will light, and as was described above, the driver transistor 38 is rendered nonconductive and the solenoid coil 34 will be deenergized to prevent solenoid chatter. The solenoid coil will remain deenergized and the solenoid contacts 35 and 36 will remain open until the accelerator pedal 31 is released to a position which will impress less than the predetermined upper value or 8 volts across the solenoid contacts.

Both protective circuit means of the control 10, shown in FIG. 1, and the control 10a, shown in FIG. 2, will prevent the driver transistor 38 from being rendered conductive, and hence, prevent the solenoid coil from being energized, if the accelerator pedal 31 is depressed significantly, (e.g., closing latching switch 58 (FIG. 1) or impressing more than 8 volts across the solenoid contacts (FIG. 2) before the ignition or seat switches are closed, thus preventing uncontrolled fast starts of the vehicle.

Figure 3:
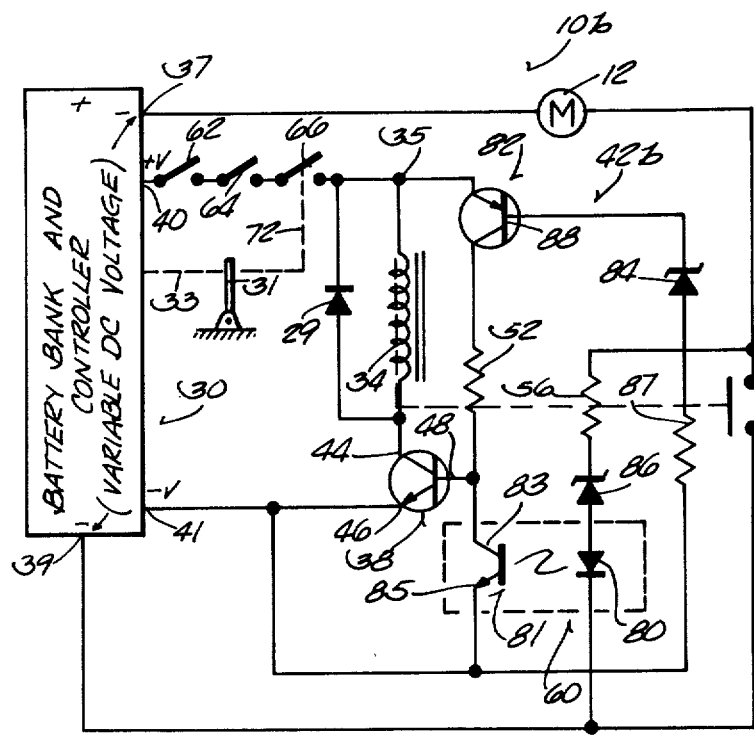
FIG. 3 is a schematic view similar to FIG. 1 illustrating another alternative DC motor control embodying various features of the invention.

Shown in FIG. 3 is a motor control 10b similar to the controls shown in FIGS. 1 and 2, but which includes protective circuit means 42b modified from the protective circuit means 42a previously described to include solenoid drop-out means to additionally prevent the solenoid driver transistor 38 from being rendered conductive if the normally generally constant supply voltage across the terminals 40 and 41 drops below a predetermined lower value. Thus, the solenoid coil drops out or is deenergized to open the solenoid contacts if the generally constant supply voltage drops below the predetermined lower value.

More particularly, the protective circuit means 42b additionally includes semiconductor switching means, preferably in the form of transistor 82, connected in lead 50 between the resistor 52 and the supply terminal 40, and also includes lower voltage threshold means, preferably in the form of zener diode 84, connected in series relation with a current limiting resistor 87 between the base 88 of transistor 82 and the supply terminal 41. If zener diode 84 is chosen to have a breakdown voltage of 12 volts, for example, the semiconductor switching means or transistor 82 will conduct when the supply voltage is greater than 12 volts by virtue of base current which flows through resistor 87 and zener diode 84. As long as transistor 82 is conducting and the solenoid contacts 35 and 36 are closed, the driver transistor 38 will have base current and keep the solenoid coil energized. If, however, the supply voltage between terminals 40 and 41 drops from a normal voltage, e.g., 18 volts, to below 12 volts, for example, because of battery depletion or exhaustion, the base current to transistor 82 will be cut off because zener diode 84 no longer conducts, thereby cutting off the base current to solenoid driver transistor 38, and hence, the solenoid contacts open.

The protective circuit means 42b, as described so far, can be used with suitable solenoid latching arrangements, and, as shown in FIG. 2, is preferably used with the components of protective circuit means 42a previously described. More particularly, when the solenoid contacts open, the buffer control means or optical coupler 60 included in protective circuit means 42b operates as it did in the motor control 10a shown in FIG. 2, to keep the solenoid coil deenergized, even if the supply voltage again rises to above 12 volts. The solenoid coil 34 will remain deenergized until the accelerator pedal is released to a position which will impress less than the predetermined upper value or 8 volts across the solenoid contacts so that zener diode 86 no longer conducts and the LED 80 of the optical coupler turns off. Thus the sequence of required operation provided by the protective circuit means 10b warns the operator that his batteries are depleted and need recharging. The control 10b also operates as does control 10a to prevent solenoid chatter, if the supply voltage remains greater than the predetermined lower value, for example 12 volts, but the solenoid contacts open when the voltage across the solenoid contacts is greater than the predetermined upper value or 8 volts.

Figure 4:
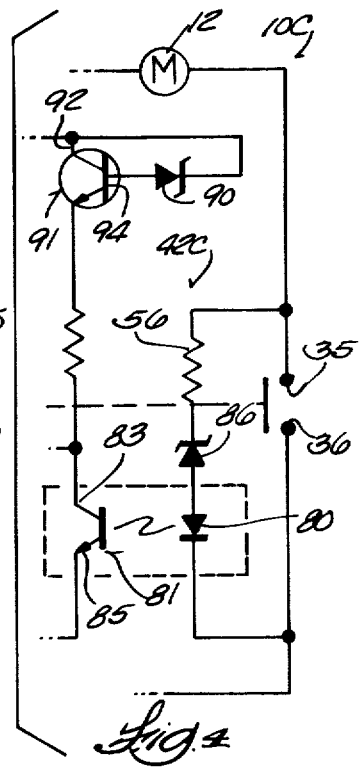
FIG. 4 is a partial schematic view showing the control of FIG. 3 with a modified portion to illustrate another alternative DC motor control embodying various features of the invention.

Shown in FIG. 4 is another motor control 10c, the same as shown in FIG. 3, except that zener diode 84 and resistor 87 are replaced by a zener diode 90 connected between the collector 92 and base 94 of a transistor 91 which replaces transistor 82. This protective circuit means arrangement 42c will provide a greater variation of the lower voltage supply level at which the solenoid is dropped out, this variation being a function of temperature because the base-emitter junction of the driver transistor 38 (see FIG. 3) is part of the zener diode voltage sensing circuit. If the driver transistor 38 is a Darlington transistor, for example, the dependence of the solenoid drop-out voltage on temperature variation would be appreciable.

Figure 5:
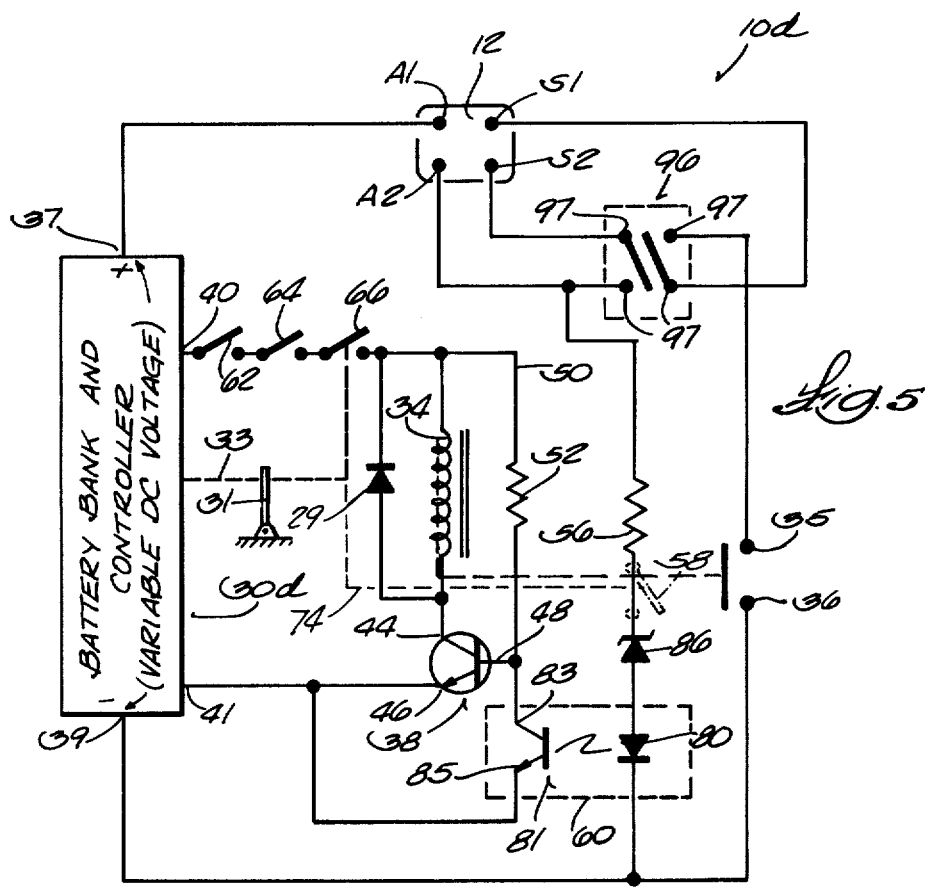
FIG. 5 is a schematic view similar to FIGS. 1 and 3 illustrating another alternative DC motor control embodying various features of the invention.

Shown in FIG. 5 is a direct current motor control 10d which differs from the motor control 10a shown in FIG. 2 by illustrating schematically more details of the DC motor, designated 12 and illustrating a conventional reversing switch, generally designated 96, previously generally represented by the labelled box 30, the battery bank and controller now being labelled 30d. The motor control shown in FIG. 5 operates in case the operator moves the reversing switch through the neutral position at a time that the motor is energized at higher voltages, e.g., voltages higher than the breakdown voltage of zener diode 86, to open and prevent reclosing of the solenoid contacts and to prevent current arcing at the reversing switch and dangerous vehicle motions.

More particularly, the connection from resistor 56 of protective circuit means 42d connects to the reversing switch end of the motor armature winding, designated A2, (the other end of the armature winding being designated A1), instead of to the solenoid contact 35. The result is that the voltage sensing side of the optical coupler 60 now looks across the series combination of the reversing switch contacts, designated 97, the series field winding of the motor connected to terminals S1 and S2, and the solenoid contacts 35 and 36. If either the reversing switch contacts or solenoid contacts open, assuming the accelerator pedal is depressed sufficiently so that the voltage breaks down zener diode 86, the LED 80 of the optical coupler 60 lights and the solenoid coil 34 will be deenergized by driver transistor 38 in the same manner as was described with the motor control 10a shown in FIG. 2.

As shown in FIG. 5, zener diode 86 is in the circuit for the purpose described with respect to FIG. 2, and also to allow the protective circuit means 42d to ignore small voltages that might be developed across the motor series field winding during normal motor operation. Specifically, zener diode 86 prevents such small voltages, i.e., voltages having a magnitude less than the zener diode breakdown voltage, from reaching or lighting the LED of the optical coupler 60 and deenergizing the solenoid coil 34.

As illustrated in FIG. 5, a solenoid latching switch 58 (shown with phantom lines) could be included, if desired, in the protective circuit means 42d. The solenoid latching switch 58, which is connected to pedal 31 by linkage 74, (described in connection with the control 10 of FIG. 1) insures that the motor 12 can be energized, even if leakage voltages in excess of the breakdown voltage of zener diode 86 exist across the solenoid contacts during starting of the vehicle. Such leakage voltages can exist in vehicles utilized in an outdoor environment where there is, for example, exposure to saltwater, or in vehicles which have been poorly maintained.

More particularly, as was explained in the description of the control 10 shown in FIG. 1, assuming the ignition and seat switches 62 and 64 are closed, the solenoid latching switch 58 is open until after the solenoid actuating switch 66, and hence, the solenoid contacts 35 and 36, are closed. Thus, the latching switch 58 prevents the zener diode 86 from sensing the voltage across the solenoid contacts during starting. Accordingly, if during starting, leaking voltages in excess of the zener diode breakdown voltage exist across the solenoid contacts, the open solenoid latching switch 58 keeps the zener diode 86 from breaking down, and thus, allows starting of the vehicle.

As discussed above, the zener diode 86 remains operative after closing of the solenoid latching switch 58 to prevent solenoid chatter during vehicle operation, and also to prevent small voltages developed across the series field winding from lighting the LED of the optical coupler and stopping vehicle operation. In addition to including the solenoid latching switch 58, the protective circuit means 42d could also be modified as shown in FIGS. 3 and 4, if desired, so that the solenoid coil would drop out should the supply voltage decrease below a predetermined lower value.

It is to be understood that the invention is not confined to the particular construction and arrangement of parts herein illustrated and described, but embraces all such modified forms thereof, as come within the scope of the following claims.

What is claimed is:

1. A direct current motor control circuit adapted for connection to first and second supply terminals of a DC power source and to a DC motor connected between positive and negative terminals of a DC power source, said control circuit comprising a solenoid including a solenoid coil connected between the first and second supply terminals, and having a pair of solenoid contacts connected in series relation with the DC motor between the positive and negative terminals and which close to energize the DC motor when current flows through said solenoid coil, semiconductor switching means having first and second terminals connected in series relation with said solenoid coil between the first and second supply terminals for controlling the current flow through said solenoid coil, and protective solenoid latching circuit means connected to said semiconductor switching means for controlling conduction of said switching means to selectively prevent current flow through said solenoid coil and closing of said solenoid contacts.

2. A circuit in accordance with claim 1 wherein said protective solenoid latching circuit means includes buffer control means for electrically isolating said solenoid contacts from said solenoid coil and for controlling conduction of said semiconductor switching means in response to the magnitude of voltage across said solenoid contacts to prevent chatter of said solenoid contacts.

3. A circuit in accordance with claim 2 wherein said protective circuit means also includes solenoid drop-out means connected to said semiconductor switching means for preventing conduction of said semiconductor switching means when the voltage supplied by said first and second supply terminals decreases below a predetermined lower value.

4. A circuit in accordance with claim 2 wherein said protective solenoid latching circuit means further comprises upper voltage threshold means connected to said buffer control means for sensing the voltage across said solenoid contacts and for rendering said buffer control means operative to prevent conduction of said semiconductor switching means when the voltage across said solenoid contacts exceeds a predetermined upper value.

5. A circuit in accordance with claim 4 wherein said buffer control means comprises an optical coupler including a light sensitive transistor connected to said semiconductor switching means and a LED connected in series relation with said upper voltage threshold means across said solenoid contacts so that when the voltage across said solenoid contacts exceeds said predetermined upper value, current flows through said voltage threshold means and said LED to render conductive said light sensitive transistor which prevents conduction of said semiconductor switching means.

6. A circuit in accordance with claim 5 wherein said upper voltage threshold means comprises a zener diode having a breakdown voltage generally equal to said predetermined upper value, and wherein said protective solenoid latching circuit means further comprises current limiting means connected in series relation with said zener diode and said LED.

7. A circuit in accordance with claim 6 wherein said semiconductor switching means comprises a driver transistor including a third terminal comprising a base, and wherein said light sensitive transistor is connected to said base to shunt the base current of said driver transistor when said light sensitive transistor is rendered conductive.

8. A circuit in accordance with claim 1 wherein said protective solenoid latching circuit means includes solenoid drop-out means connected to said semiconductor switching means for preventing conduction of said semiconductor switching means when the voltage supplied by said first and second supply terminals decreases below a predetermined lower value.

9. A circuit in accordance with claim 8 wherein said semiconductor switching means comprises first semiconductor switching means, and wherein said solenoid drop-out means comprises second semiconductor switching means connected to said first semiconductor switching means for controlling conduction of said first semiconductor switching means, and also comprises lower voltage threshold means connected to said second semiconductor switching means for rendering said second semiconductor switching means nonconductive to prevent conduction of said first semiconductor switching means when the voltage across the first and second supply terminals drops below said predetermined lower value.

10. A circuit in accordance with claim 9 wherein said first semiconductor switching means comprises a first transistor including a third terminal comprising a base, and wherein said second semiconductor switching means comprises a second transistor including a base, and an emitter and a collector connected in series between one of said supply terminals and said first transistor base, and wherein said lower voltage threshold means is connected between said second transistor base and the other one of said supply terminals.

11. A circuit in accordance with claim 9 wherein said first semiconductor switching means comprises a first transistor including a third terminal comprising a base and wherein said second semiconductor switching means comprises a second transistor including a base, and an emitter and a collector connected in series between one of said supply terminals and said first transistor base, and wherein said voltage threshold means is connected to said second transistor base and said one of said supply terminals.

12. A circuit in accordance with claim 11 wherein said first transistor comprises a Darlington transistor and wherein said lower voltage threshold means comprises a zener diode which senses the voltage between the first and second supply terminals in series with the base emitter junction of said Darlington transistor so that the magnitude of said lower predetermined voltage at which said second transistor is rendered nonconductive is temperature dependent.

13. A circuit in accordance with claim 1 further comprising a solenoid actuating switch connected in series with said solenoid coil between the first and second supply terminals, and wherein said protective solenoid latching circuit means comprises solenoid latching switch means associated with said solenoid actuating switch for being in an open position when said solenoid actuating switch is open, and for moving from said open position to a closed position after closing of said solenoid actuating switch, said protective solenoid latching circuit means also comprising buffer control means for electrically isolating said solenoid contacts from said solenoid coil, and connected to said solenoid latching switch means for preventing conduction of said semiconductor switching means to prevent chatter of said solenoid contacts when said solenoid contacts open after said solenoid latching switch means has moved to said closed position.

14. A direct current motor control circuit adapted for connection to first and second supply terminals of DC power source and to a DC motor connected between positive and negative terminals of a DC power source, said control circuit comprising a solenoid including a solenoid coil having one end connected to the first supply terminal and having an opposite end, and having a pair of solenoid contacts connected in series relation with the DC motor between the positive and negative terminals and which close to energize the DC motor when current flows through said solenoid coil, semiconductor switching means having a first terminal connected to said opposite end of said solenoid coil, a second terminal connected to the second supply terminal, and a third terminal, said switching means being selectively rendered conductive for allowing current flow through said solenoid coil, and protective solenoid latching circuit means including an optical coupler for electrically isolating said solenoid contacts from said solenoid coil, said coupler having a light sensitive transistor connected to said third terminal of said semiconductor switching means and having a LED, said protective solenoid latching circuit means also including an upper voltage threshold means connected in series relation with said LED across said solenoid contacts so that when the voltage across said solenoid contacts exceeds a predetermined upper value, current flows through said voltage threshold means and said LED to render conductive said light sensitive transistor which shunts said third terminal of said semiconductor switching means to prevent conduction of said semiconductor switching means and chatter of said solenoid contacts.

15. A circuit in accordance with claim 14 wherein said upper voltage threshold means comprises a zener diode having a breakdown voltage generally equal to said predetermined upper value, and wherein said protective solenoid latching circuit means also includes current limiting means connected in series relation with said zener diode and said LED.

16. A direct current motor control comprising a DC power source including first and second supply terminals to provide a generally consistant voltage between said supply terminals and a DC motor connected between positive and negative terminals supplying a variable DC voltage, and a control circuit comprising a solenoid including a solenoid coil having one end connected to said first supply terminal and having an opposite end, and having a pair of solenoid contacts connected in series relation with the DC motor between the positive and negative terminals and which close to energize the DC motor when current flows through said solenoid coil, semiconductor switching means having a first terminal connected to said opposite end of said solenoid coil, a second terminal connected to said second supply terminal, and having a third terminal, said switching means being selectively rendered conductive for allowing current flow through said solenoid coil, and protective solenoid latching circuit means including an optical coupler for electrically isolating said solenoid contacts from said solenoid coil, said coupler having a light sensitive transistor connected to said semiconductor switching means third terminal and having a LED, said protective solenoid latching circuit means also including an upper voltage threshold means connected in series relation with said LED across said solenoid contacts for causing current flow through said voltage threshold means and said LED when the voltage across said solenoid contacts exceeds a predetermined upper value to render conductive said light sensitive transistor which shunts said third terminal of said semiconductor switching means to prevent conduction of said semiconductor switching means and chatter of said solenoid contacts.

17. A control in accordance with claim 16 wherein said DC motor includes a series field winding, and further comprising a reversing switch including reversing switch contacts connected to said DC motor and to one of said solenoid contacts and wherein said upper voltage threshold means is operative for causing said current flow to prevent conduction of said semiconductor switching means when the voltage across the series combination of said reversing switch contacts, said series field winding of said DC motor, and said solenoid contacts exceeds said predetermined upper value.

18. A control in accordance with claim 17 wherein said upper voltage threshold means comprises a zener diode having a breakdown voltage generally equal to said predetermined upper value, and wherein said protective solenoid latching circuit means also includes current limiting means connected in series relation with said zener diode and said LED.

19. A control in accordance with claim 17 further comprising a solenoid actuating switch connected in series with said solenoid coil between the first and second supply terminals, and wherein said protective solenoid latching circuit means further comprises solenoid latching switch means connected in series relation with said upper voltage threshold means and said LED and associated with said solenoid actuating switch for being in an open position when said solenoid actuating switch is open, and for moving from said open position to a closed position after closing of said solenoid actuating switch, said solenoid latching switch means also for preventing said upper voltage threshold means from causing said current flow preventing conduction of said semiconductor switching means until after said solenoid latching switch means moves to said closed position.

20. A control in accordance with claim 19 wherein said upper voltage threshold means comprises a zener diode having a breakdown voltage generally equal to said predetermined upper value, and wherein said protective solenoid latching circuit means also includes current limiting means connected in series relation with said zener diode and said LED.

21. A direct current motor control circuit adapted for connection to first and second supply terminals of a DC power source and to a DC motor having a series field winding and connected with a reversing switch between positive and negative terminals of a DC power source, said control circuit comprising a solenoid including a solenoid coil having one end connected to the first supply terminal and having an opposite end, and having a pair of solenoid contacts connected in series relation with the DC motor and reversing switch between the positive and negative terminals and which close to energize the DC motor when current flows through said solenoid coil, semiconductor switching means having a first terminal connected to said opposite end of said solenoid coil, a second terminal connected to the second supply terminal, and a third terminal, said switching means being selectively rendered conductive for allowing current flow through said solenoid coil, a solenoid actuating switch connected in series with said solenoid coil between the first and second supply terminals, and protective solenoid latching circuit means including an optical coupler for electrically isolating said solenoid contacts from said solenoid coil, said coupler having a light sensitive transistor connected to said third terminal of said semiconductor switching means and having a LED, an upper voltage threshold means connected in series relation with said LED for causing current flow through said voltage threshold means and said LED when the voltage across the series combination of the reversing switch contacts, the series field winding of the motor, and said solenoid contacts exceeds a predetermined upper value to render conductive said light sensitive transistor which shunts said third terminal of said semiconductor switching means to prevent conduction of said semiconductor switching means and chatter of said solenoid contacts, said protective solenoid latching circuit means also including solenoid latching switch means connected in series with said LED and said upper voltage threshold means and associated with said solenoid actuating switch for being in an open position when said solenoid actuating switch is open, and for moving from said open position to a closed position after closing of said solenoid actuating switch, said solenoid latching switch means also for preventing said upper voltage threshold means from causing said current flow preventing conduction of said semiconductor switching means until after said solenoid latching switch means moves to said closed position.

22. A control in accordance with claim 21 wherein said upper voltage threshold means comprises a zener diode having a breakdown voltage generally equal to said predetermined upper value, and wherein said protective solenoid latching circuit means also includes current limiting means connected in series relation with said zener diode and said LED.

23. A direct current motor control circuit adapted for connection to first and second supply terminals of a DC power source and to a DC motor having a series field winding and connected with a reversing switch between positive and negative terminals of a DC power source, said control circuit comprising a solenoid including a solenoid coil connected between the first and second supply terminals, and having a pair of solenoid contacts connected in series relation with the DC motor and reversing switch between the positive and negative terminals and which close to energize the DC motor when current flows through said solenoid coil, semiconductor switching means having first and second terminals connected in series relation with said solenoid coil between the first and second supply terminals for controlling the current flow through said solenoid coil, a solenoid actuating switch connected in series with said solenoid coil between the first and second supply terminals, and protective solenoid latching circuit means including buffer control means for electrically isolating said solenoid contacts from said solenoid coil and for controlling conduction of said semiconductor switching means, an upper voltage threshold means connected to said buffer control means for rendering said buffer control means operative when the voltage across the series combination of the reversing switch contacts, the series field winding of the motor, and said solenoid contacts exceeds a predetermined upper value for preventing conduction of said semiconductor switching means and chatter of said solenoid contacts, said protective solenoid latching circuit means also including solenoid latching switch means connected in series with said upper voltage threshold means and associated with said solenoid actuating switch for being in an open position when said solenoid actuating switch is open, and for moving from said open position to a closed position after closing of said solenoid actuating switch, said solenoid latching switch means also for preventing said upper voltage threshold means from rendering said buffer means operative for preventing conduction of said semiconductor switching means until after said solenoid latching switch means moves to said closed position.

* * * * *